3 Sheets—Sheet 1.

E. B. HAMLIN.

Assignor, by mesne assignments, to THE STANDARD ELECTRICAL WORKS.

TELEPHONE SWITCH BOARD.

No. 10,508. Reissued Aug. 12, 1884.

Attest
Carl Spengel
Jacob Ruckert

Inventor
Everlyn B. Hamlin
By Joptha Garrard Atty.

E. B. HAMLIN.

Assignor, by mesne assignments, to THE STANDARD ELECTRICAL WORKS.

TELEPHONE SWITCH BOARD.

No. 10,508. Reissued Aug. 12, 1884.

Attest
Carl Spengel
Jacob Ruckert

Inventor
Everlyn B. Hamlin
by Josiah Garrard Atty.

E. B. HAMLIN. 3 Sheets—Sheet 3.

Assignor, by mesne assignments, to THE STANDARD ELECTRICAL WORKS.

TELEPHONE SWITCH BOARD.

No. 10,508. Reissued Aug. 12, 1884.

Attest
Carl Spangel
Jacob Ruckert

Inventor
Everlyn B. Hamlin
by Joseph Gardner Atty.

THE NORRIS PETERS CO. PHOTO-LITHO., WASHINGTON, D. C.

UNITED STATES PATENT OFFICE.

EVERLYN B. HAMLIN, OF CHICAGO, ILLINOIS, ASSIGNOR, BY MESNE ASSIGNMENTS, TO THE STANDARD ELECTRICAL WORKS.

TELEPHONE SWITCH-BOARD.

SPECIFICATION forming part of Reissued Letters Patent No. 10,508, dated August 12, 1884.

Original No. 279,747, dated June 19, 1883. Application for reissue filed March 31, 1884.

*To all whom it may concern:*

Be it known that I, EVERLYN B. HAMLIN, of Chicago, in the county of Cook and State of Illinois, have made certain new and useful Improvements in Telephone Switch-Boards; and I do hereby declare the following to be a full, clear, and exact description of the same, sufficient to enable one skilled in the art to which my invention belongs to make and use the same, reference being had to the accompanying drawings, forming a part of this specification, in which—

Figure 1:
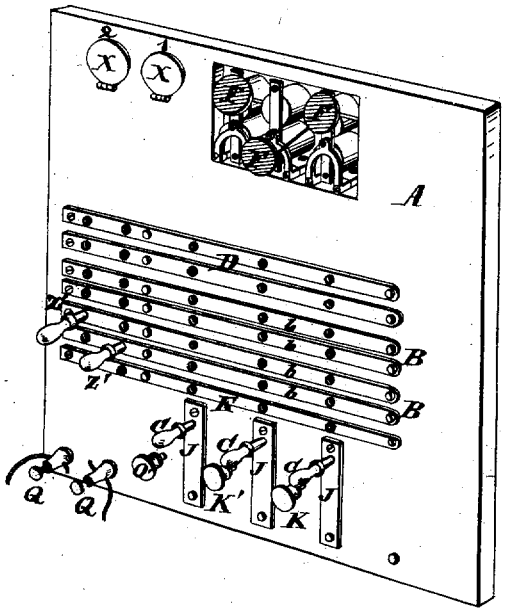
Figure 2:
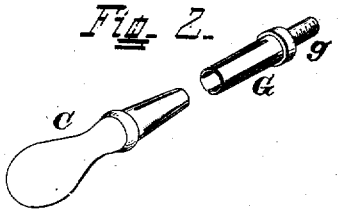
Figure 3:
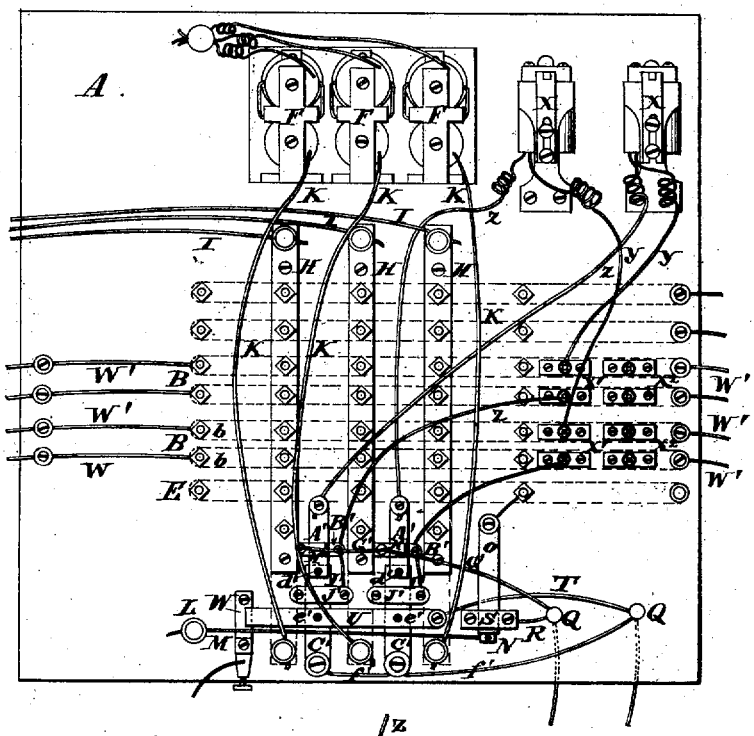
Figure 4:
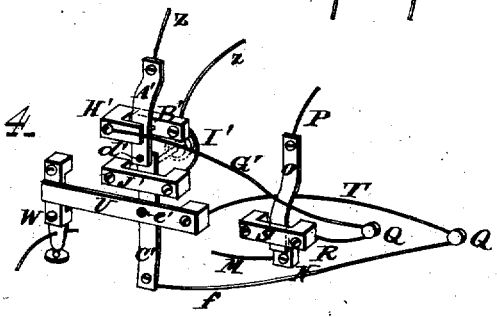
Figure 5:
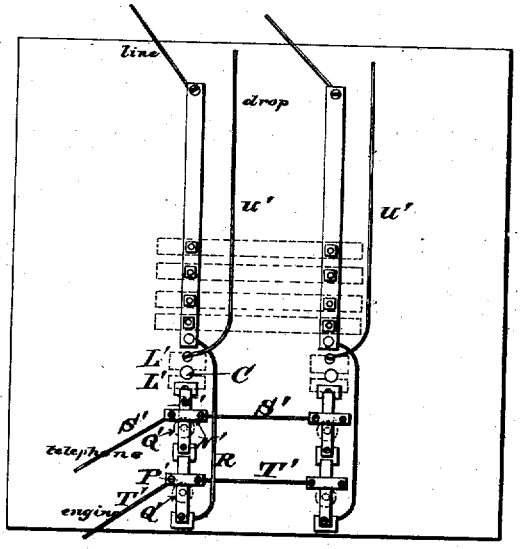

Figure 1, Sheet I, is a perspective view of the switch-board. Fig. 2, Sheet I, is a perspective view of one of the pins and its connecting-socket. Fig. 3, Sheet II, is a rear elevation of the board. Fig. 4, Sheet II, is a perspective view of the spring-switches. Fig. 5, Sheet III, is a plan view of a modification in the arrangement of the switches; and Fig. 6, Sheet III, is a diagram showing a method of connecting the telephone-lines of several boards at a central office.

Similar letters of reference in the several figures of the drawings indicate the same parts.

My invention has for its object to provide an improved system of making telephonic connections at the exchanges or central office of telephone-lines, and to simplify and improve the construction of the switch-boards and their connections.

The usual method of arranging separate telephone-lines at the central office consists in attaching the ends of the line-wires to separate metallic sockets placed on or in a switch-board. To connect any two of these lines for the purpose of establishing communication between any two subscribers, two pins or plugs joined together by a wire cord are inserted in the metal sockets forming the terminals of such lines. It frequently happens, however, that in the course of business so many connections are made on a board that the crossing and interlacing of the cords confuses the operator and causes him to err in making the connections called for.

The first part of my invention is designed to remedy this defect; and to that end it consists in joining each line-wire with a metallic strip or wire connection on the board, so arranged with respect to separate metallic pin-strips that a connection shall be made between them by inserting a metal pin through the pin-strip, and one of said line-strips being joined to another for connecting two lines by inserting a pin in the pin-strip of both lines. The line-strips are permanently attached to the board and take the place of the cords connecting the pins. The latter are therefore free to be separately shifted, and the face of the board is prevented from being obstructed to confuse the operator.

Another feature of my invention consists in combining, with the several line-bars and with each set of connecting strips or bars, a disconnecting-drop in circuit with said connecting strips and bars, arranged to be placed between any two connected lines, so as to be operated by any subscriber, who has been using the line, to announce at the central office the fact that he has ceased talking, and that the two lines may be now disconnected.

The invention also consists in the means for throwing the telephone at the exchange into the circuit of two subscribers' lines for the purpose of ascertaining if they are properly connected.

The invention further consists in connecting two or more telephone switch-boards at the central office by joining their corresponding pin-strips to each other, so as to continue each set throughout all the boards of the group and in detaching the disconnecting-drops and telephones from all the boards but one, whereby, when all the boards are not required for constant use, two or more may be thrown together, so as to make one board, in effect, to be managed by one operator.

The invention also consists in connecting the lines of one board with those of another board, while the independent operation of each is preserved, to connect any two of its lines.

In the accompanying drawings, A represents a wooden switch-board of the ordinary or any preferred size and form, provided upon its face with parallel metal strips *b b*, arranged in sets of two, as shown at B, a sufficient number of such sets being employed to accommodate the business of the board. They are perforated at regular intervals, to receive a plug or pin, C, and hence I designate them as "pin-strips." Similar perforated strips, D, are also arranged on the board above the sets B; but, instead of being local as to that board, they are employed to combine the lines of one board with those of other boards at the central office, as I will presently describe in detail; and hence I term them "combination pin-strips." Each board is also provided with a single perforated strip, E, placed below all the others, and it is used in making the connections with the call and telephone, and is therefore termed the "call and telephone strip." But one of these strips is needed for each board.

F F are the annunciator-drops, located at any convenient point on or off the board, and having their wires running to a common ground.

H H are parallel metal strips or wires arranged on the back of the board at right angles to the strips B D E on its face, but having no connection therewith or with each other, excepting as it is made by the pins, as I will presently describe. The strips H, which, for convenience of description, I call "line-strips," each connects at one end with a line-wire, I, as shown in Fig. 3, forming, in effect, a continuation thereof, and therefore the line-strips on each board are equal in number to the number of lines. Each line-strip has a connection with an annunciator-strip, J, on the face of the board when a pin, C, is inserted in an annunciator-strip, and each annunciator-strip is connected with an annunciator-drop by a wire, K, on the back of the board.

The pin-connections between the strips of the board are made by the metal pointed pins C and the metal tubes or sockets G let into the board.

The tubes are seated in recesses of the board, so that their screw-shanks *g* shall project through it and through the line-strips, to form a metallic connection therewith. By applying nuts to the ends of the shanks, the tubes are locked in the board and the line-strips fastened in place.

The open ends of the tubes terminate in the board a short distance from the strips on its face, so as to insulate them from the line-strips. When the pins are inserted in the pin-strips, their points enter the tubes, and thus form metallic connections between the pin and line strips.

If desired, the tubes or pins, or both, may be slotted, to form elastic connections between them, and thereby insure a more perfect contact.

The magneto-engine employed in making the calls is attached to a binding-post, L, on the back of the board, and this, by a wire, M, connects with an anvil, N, upon which rests the free end of a spring, O, whose opposite end is joined to the call and telephone strip E by a wire or other connection, P.

The spring O is operated by a push-pin, $O^2$, on the face of the board, to break the connection with the magneto engine and to throw the ground onto the telephone, for the purpose of talking.

The telephone is connected to binding-posts Q on the board, one post being joined by a wire, R, to a bridge, S, placed over that end of spring O which bears upon the anvil, and the other post forming a ground-connection for the telephone through the wire T, break-spring U, and block W, to which the ground-wire is attached.

X X are disconnecting-drops placed on or off the board at any convenient point—one for each set of local connecting pin-strips B, and marked to correspond therewith. One wire, *y*, from each of these drops is connected directly with one pin-strip of a set, B, and the other wire, *z*, is connected with the other pin-strip of the same set through the medium of a flat spring, A′, and anvil B′, upon which the free end of the spring bears. One spring and one anvil are used with each disconnecting-drop and each set B of pin-strips, and they are placed at any convenient point on or off the board.

C′ C′ are flat springs arranged on the back of the board, under the spring U, with the free ends beneath the free ends of the springs A′, from which they are insulated by small rubber or other blocks, *d′*, inserted into one or the other spring, and they are also insulated from the spring U by similar blocks, *e′*, as shown in Figs. 3 and 4. The ends of the springs C′ on the board are connected by a wire, *f′*, which also connects with one of the binding-posts of the telephone. These springs and their connections are employed in throwing off the ground from the telephone, and in placing the latter in the circuit of two lines. A wire, G′, connects the other binding-post of the telephone with one of the bridges, H′, over the springs A′ of the disconnecting-drop attachment, the series of said bridges being joined together by a continuation of the wire. Each anvil B′ is further joined by a wire, I′, to additional bridges, J′, over the springs C′, as shown in Fig. 3.

Push-pins K′ on the face of the board are arranged to be pressed against the springs C′, for throwing the telephone into the circuit of any two lines, and for lifting the spring U off the block W, to break the ground-connection.

Instead of using a single long spring, U, for the whole number of lines, I prefer to use a short spring for each line, as being the best and most practicable arrangement.

The operation of the switch-board thus far described is as follows: The pins C normally occupy the position shown in Fig. 1, to connect the annunciator-strips J with their respective line-strips. When, therefore, a call is made upon any line, the magnet attracts an armature of the annunciator and releases the drop connected with that line. To answer such call, the operator at the switch-board shifts the pin on that line from the strip J to the call and telephone strip E, thereby breaking the connection with the annunciator-drop and connecting the line-strip with the call and telephone strip. He then operates the engine to produce the necessary current for answering the call. Having thus announced that the attention of the exchange is attracted, the operator throws the telephone into the line by pressing in the push-pin $O^2$, to hold the spring O against the bridge S. This establishes a circuit from the ground through block W, spring U, wire T, the telephone-wire R, bridge S, and wire P to the call and telephone strip E, and from thence to the line, as above described. If now the operator, being in telephonic communication with the person who has made the call, receives his instructions to connect said person's line with the line of another subscriber, he releases the push-pin $O^2$, shifts the pin C of the first line to one strip of any set of pin-strips for the purpose of connecting it with the line-strip of said line. He then shifts the pin of the line called for from its annunciator-strip J to the call and telephone strip, operates the engine to make the call, and pushes in the button $O^2$, to connect said line with the telephone, so that he can advise the subscriber of such line that he is wanted by the subscriber of the other line. Upon notification that the desired subscriber's attention is secured, the operator removes the pin C of the line called from the call and telephone strip, and places it in the other pin-strip of the set containing the pin of the calling-line, which operation connects the two lines through their disconnecting- drops. To distinguish between the calling and called line, the pin of the calling-line is placed in the lower strip of the set, and the pin of the called line in the upper strip of the set. This enables the operator to tell at a glance which line made the call.

It will be observed that all the line-strips cross the whole number of pin-strips, and that, as the pin-strips are arranged in sets of two, any two lines can be connected by selecting the proper sets or groups. For example, referring to Fig. 3, if the left-hand line is to be connected with the right-hand line, the first pin is placed in the lower pin-strip of the second set from the bottom of the board to connect with the left-hand line-strip. The other pin is placed in the upper pin-strip of the same set, to connect with the right-hand line-strip. The telephone-circuit, taking this connection for illustration, is from the left-hand line and line-strip through the lower pin and pin-strip to the connection with the wire *z*; thence through said wire, the anvil B′, spring A′, and the remainder of the wire *z* to the disconnecting-drop. From the drop it passes through wire *y* to the upper pin-strip of the set, and from thence to the third line-strip and its line. The circuit is relatively the same in all the sets and lines connected.

For the purpose of enabling the operator to tell when two lines are properly connected and at work, he throws his telephone into the circuit of the two lines by pressing in the appropriate push-button K′. This, by bearing against the spring C′, lifts U from the block W, to throw off the ground and forces said spring C′ against the bridge J′. The same movement lifts the spring A′ from the anvil B′, and bears said spring against its bridge H′; but there is no connection between the three springs, by reason of the insulators *d′ e′*. The circuit is then from one part of wire *z*—say the short part, as shown in Fig. 3—to the other or long part of said wire, through the block B′, wire I′, bridge J′, spring C′, and wire *f′* to the telephone; thence through the telephone, the wire G′, bridge H′, and spring A′ to the long part of wire *z*, the telephone being thus kept in the circuit as long as the pressure is applied to the push-button. By this means the operator is enabled to determine whether or not the two lines are properly connected. When two persons have ceased talking over the connected lines, one or the other, by calling back, causes the disconnecting-drop of the two lines to fall, and thereby announces at the exchange that the lines are clear. By employing the line-strips and pin-strips to make the connections between the lines, cords for joining the pins are dispensed with, and the face of the board is kept clear and unobstructed, so that the operator is enabled to distinctly and rapidly trace all the connections without confusion or mistake.

Fig. 5 of the drawings shows a modification in the means for breaking the line-connections with the annunciator-drops, and connecting a line with the call and telephone. In this case the call and telephone strip E is not used; but in its stead the face of the board is provided with two metal plates, L′ L′, for each line-strip, but disconnected therefrom. Their proximate edges are recessed, so that a pin, C, inserted in an opening in the board between them, shall touch their edges, to effect their connection. The upper plate of each set is connected by a wire, U′, with the annunciator-drop of its line, and the lower plate has a metallic connection on the back of the board, with a free end of a flat spring, M′, which is spanned by a bridge, N′. A second spring, O′, is secured to the back of the board, and rests at one end upon the metal block by which the spring M′ is held in place, thereby making a connection between the two springs. A bridge, P′, spans the spring O′, and each spring is provided with a push-pin on the face of the board, as shown by dotted lines at Q′. The lower ends of the line-strips are each connected by a wire, R′, to the fastening-blocks of the springs O′, while the bridges N′ connect with each other and the telephone through wires S′. The bridges P′ connect with each other and the engine by means of wires T′. The circuit from the line-strip to the annunciator-drop is through the wire R′, springs O′ M′, pin C, plates L′, and wire *u′*.

To use the engine, the spring O′ is pushed in against the bridge P′; and to use the telephone the spring M′ is pushed against the bridge *n*′ and there held while the telephone is used. These are the temporary disconnections preparatory to connecting two lines; and when the two lines to be joined have been indicated by the parties desiring to communicate with each other, the pins C are removed from the plates L′ L′ of such lines, and inserted in the pin-strips thereof. By this arrangement the repeated shifting of pins from the annunciator-strips to the call and telephone strips, and thence to the pin-strips, is avoided, only one change being necessary to cut off the annunciator and connect two lines.

If the business of the exchange should at any time be so dull that all of the switch-boards are not required for constant use, then two or more may be thrown together, to practically make one board under the management of one operator. This is effected by the following means: One end of each board is provided on its back with wires W′, joined to the pin-strips, and the other end with two sets, X′ $X^2$, of short metal plates, to receive set screws or pins Z′, inserted through the pin-strips from the front of the board. The set X′ of these plates is used for making and breaking the connections with the disconnecting-drops when the pins are applied, and the other set, $X^2$, is used for connecting corresponding pin-strips of the boards. To make the connections, the wires W′ on one board are joined to the plates $X^2$ of the board next adjoining, and the pins or set-screws Z′ of the disconnecting-plates X, on all the boards to be joined but one, are loosened or removed, to break the connection with the pin-strips and cut out the disconnecting-drops, together with the apparatus for throwing the telephone into the circuit with them. The set-screws or pins are then forced into the connecting-plates $X^2$ to connect them with the line-strips B. This places all the pin-strips under the control of one board, which preserves its connections with its own disconnecting-drops. All the other boards have their local connections with their lines for making and answering calls.

Figure 6:
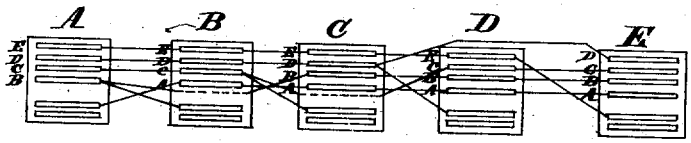

Any two or more boards, as well as the whole number, may be connected in this manner, and one operator can manage them. If a call is made from one board, he can connect the calling line with the called line of the same or any other board in the connected group; but whichever lines are joined, the disconnecting-drops and telephone connected therewith are operative from only one board of the group. For the purpose of connecting the lines of one board with the lines of other boards, while each board preserves its independent operation, there is placed on each board one or more combination pin-strips D, connecting with one or more of the sets of local pin-strips B on the other boards, the connections being made by wires. For example, supposing there are five boards at this central office, (marked, respectively, A B C D E, as shown in Fig. 6,) and each board provided with four combination pin-strips D, and one set of local pin-strips B. Every board has its combination pin-strips lettered to correspond with the combined designating-letters of the other boards—that is to say, board A has its strips lettered B C D E, and board B has its strips lettered A C D E, and so on for each board. The local pin-strips B on each board are connected by wires with all the combination-strips of the other boards, which are lettered to correspond to the designating-letter of the board bearing said local pin-strips. For example, the set of local pin-strips on the A board is connected with the A strips on all the other boards, and the set of local pin-strips on the B board is connected with the B strips on all the other boards. Additional combination pin-strips of the same letter may be added to the boards, but each additional one must be connected with another of the sets B of local pin-strips added to the boards—that is to say, another combination pin-strip (marked $A^2$) may be added to all the boards; but this would require an additional set of local pin-strips to be placed on board A, and another combination pin-strip, $B^2$, may be added to all the boards, which would require an additional set of local pin-strips on the B board, and so on, making as many additions to the boards as may be required for the business of the office.

The independent operation of each board is preserved; but a line on one board may be connected to a line on another board by joining the line-strips on one, by means of pins C, with its appropriate set of local pin-strips, and then, by like means, joining the correspondingly-marked combination-strips with the line-strips of the board having the line to be connected.

I disclaim the combination of disconnecting-drops with pin-strips, line-strips, and lines of the switch-board.

Having thus described my invention, what I claim is—

1. A telephone switch-board provided with a series of pin-strips grouped in pairs, for connecting two selected lines, and with a permanent line-strip for each line, said pin and line strips being so arranged that any two lines shall be connected by inserting a metal pin in each pin-strip of the pair indicating such lines, so as to connect said strips with the line-strips of the lines to be joined.

2. The combination, with the independent line-strips and each set of pin-strips, of a disconnecting-drop and line connected with said pin-strips, and so arranged that any two telephone-lines can be joined on the switch-board through said drops, substantially as described, for the purpose specified.

3. The combination, on a telephone switch-board, of the call and telephone strip E, with the pin-strips B and the line-strips H, substantially as described, for the purpose specified.

4. The spring-switches A′ C′, and their connections with the line and telephone, combined with the spring U, for taking off the ground of the telephone and throwing the latter into the circuit of two lines, for the purpose specified.

5. The combination of a series of telephone switch-boards and the described connecting devices, whereby the combined boards are operated as one board, as herein set forth, for the purpose specified.

6. The combination, in a series of telephone switch-boards, of the lines, the pins, and the combination pin-strips, whereby the lines of any one board of the series are joined to the lines of any other board or boards, while the independent operation of each board is preserved, substantially as described, for the purpose specified.

7. In a telephone switch-board, the combination of several series of metallic plates, each in connection with an independent line, with independent bars across each series, each series of plates and bars forming one section, and switches to connect either line of one series with the bar or bars of its own section and an intermediate switch to connect the bars of one section with the corresponding bars of another section.

8. In a telephone-exchange system, a series of connecting-strips and a series of branch circuits connected each with a pair of said strips, in combination with line-circuits, and means for temporarily connecting any two line-circuits with a pair of connecting-strips.

9. In an electrical system having a number of line-circuits emanating from a central office, a branch circuit, in combination with means for temporarily connecting it at opposite ends with any two of the line-circuits, as required, and a switch for grounding said branch at an intermediate point.

10. The combination, with a series of circuits or conductors, of means for temporarily connecting any two of said circuits or conductors with each other, as required, through a branch and switch mechanism for switching one or more central-office instruments into and out of said branch.

11. The combination, with a series of main lines, of a central office switch for connecting two of such lines for oral communication, apparatus included in each circuit to make the call or signal at the central office, and independent devices for connecting either line to pole-changing apparatus, for transmitting outgoing signals.

In testimony of which invention I, EVERLYN B. HAMLIN, hereunto set my hand this 17th day of March, 1884.

EVERLYN B. HAMLIN.

Witnesses:
ISAIAH FLITCRAFT,
JNO. BARTON PAYNE.